(12) United States Patent
Sumbul et al.

(10) Patent No.: US 11,347,477 B2
(45) Date of Patent: May 31, 2022

(54) COMPUTE IN/NEAR MEMORY (CIM) CIRCUIT ARCHITECTURE FOR UNIFIED MATRIX-MATRIX AND MATRIX-VECTOR COMPUTATIONS

(71) Applicant: Intel Corporation, Santa Clara, CA (US)

(72) Inventors: Huseyin Ekin Sumbul, Portland, OR (US); Gregory K. Chen, Portland, OR (US); Phil Knag, Hillsboro, OR (US); Raghavan Kumar, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 16/586,648

(22) Filed: Sep. 27, 2019

(65) Prior Publication Data

US 2020/0026498 A1    Jan. 23, 2020

(51) Int. Cl.
| | |
|---|---|
| *G06F 7/544* | (2006.01) |
| *G06F 17/16* | (2006.01) |
| *G06F 7/498* | (2006.01) |
| *G06F 12/02* | (2006.01) |
| *G06F 9/30* | (2018.01) |

(52) U.S. Cl.
CPC .......... *G06F 7/5443* (2013.01); *G06F 7/4981* (2013.01); *G06F 7/4983* (2013.01); *G06F 9/30098* (2013.01); *G06F 12/0246* (2013.01); *G06F 17/16* (2013.01)

(58) Field of Classification Search
CPC ....... G06F 2207/3892; G06F 2212/454; G06F 7/5443; G06F 17/16; G06F 7/4981; G06F 7/4983; G06F 2207/4824; G06F 9/30098; G06F 12/0246; G06N 3/04; G06N 3/06–063; G11C 11/00–5692
See application file for complete search history.

(56) References Cited

U.S. PATENT DOCUMENTS

| | | | |
|---|---|---|---|
| 8,832,530 B2 | 9/2014 | Pangal et al. | |
| 9,535,829 B2 | 1/2017 | Ooi et al. | |
| 2017/0316312 A1* | 11/2017 | Goyal | .................. G06N 3/0454 |

(Continued)

OTHER PUBLICATIONS

H. E. Sumbul et al., "A 2.9-33.0 TOPS/W Reconfigurable 1-D/2-D Compute-Near-Memory Inference Accelerator in 10-nm FinFET CMOS," in IEEE Solid-State Circuits Letters, vol. 3, pp. 118-121, 2020, doi: 10.1109/LSSC.2020.3007185. (Year: 2020).*

(Continued)

*Primary Examiner* — Jyoti Mehta
*Assistant Examiner* — Carlo Waje
(74) *Attorney, Agent, or Firm* — Compass IP Law PC

(57) ABSTRACT

A memory circuit includes a number (X) of multiply-accumulate (MAC) circuits that are dynamically configurable. The MAC circuits can either compute an output based on computations of X elements of the input vector with the weight vector, or to compute the output based on computations of a single element of the input vector with the weight vector, with each element having a one bit or multibit length. A first memory can hold the input vector having a width of X elements and a second memory can store the weight vector. The MAC circuits include a MAC array on chip with the first memory.

21 Claims, 10 Drawing Sheets

(56) References Cited

U.S. PATENT DOCUMENTS

| | | | |
|---|---|---|---|
| 2018/0004687 A1* | 1/2018 | Guim Bernat | G06F 13/4022 |
| 2019/0043560 A1* | 2/2019 | Sumbul | G06N 3/0635 |
| 2019/0227750 A1* | 7/2019 | Srinivasan | G06F 3/0679 |
| 2019/0340489 A1* | 11/2019 | Mills | G06N 3/08 |
| 2020/0026497 A1* | 1/2020 | Park | G06F 7/5443 |
| 2020/0034145 A1* | 1/2020 | Bainville | G06F 9/3001 |
| 2020/0034148 A1* | 1/2020 | Sumbul | G06F 9/30141 |
| 2020/0125939 A1* | 4/2020 | Liu | G06N 3/063 |
| 2020/0257500 A1* | 8/2020 | Kim | G06F 13/1673 |
| 2020/0364577 A1* | 11/2020 | Le Gallo-Bourdeau | G06N 3/084 |
| 2021/0011860 A1* | 1/2021 | Nam | G06F 13/1668 |
| 2021/0019115 A1* | 1/2021 | Venkatesh | G06F 7/5235 |
| 2021/0056396 A1* | 2/2021 | Majnemer | G06N 3/0454 |

OTHER PUBLICATIONS

A. Yanamandra, B. Cover, P. Raghavan, M. J. Irwin and M. Kandemir, "Evaluating the role of scratchpad memories in chip multiprocessors for sparse matrix computations," 2008 IEEE International Symposium on Parallel and Distributed Processing, 2008, pp. 1-10, doi: 10.1109/IPDPS.2008.4536314. (Year: 2008).*

Y. Chen, T. Krishna, J. S. Emer and V. Sze, "Eyeriss: An Energy-Efficient Reconfigurable Accelerator for Deep Convolutional Neural Networks," in IEEE Journal of Solid-State Circuits, vol. 52, No. 1, pp. 127-138, Jan. 2017, doi: 10.1109/JSSC.2016.2616357. (Year: 2016).*

Nain, et al, "Multiplier-Accumulator (MAC) Unit", International Journal of Digital Application & Contemporary Research, vol. 5, Issue 3, Oct. 2016, 4 pages.

Preethy, et al, "A High Performance RNS Multiply-Accumulate Unit", Jan. 17, 2001, 4 pages.

Ravi, et al, "Analysis and study of different multipliers to design floating point MAC units for digital signal processing applications", International Journal of Research in Advent Technology, vol. 2, No. 3, Mar. 2014, 4 pages.

* cited by examiner

Figure 4A:
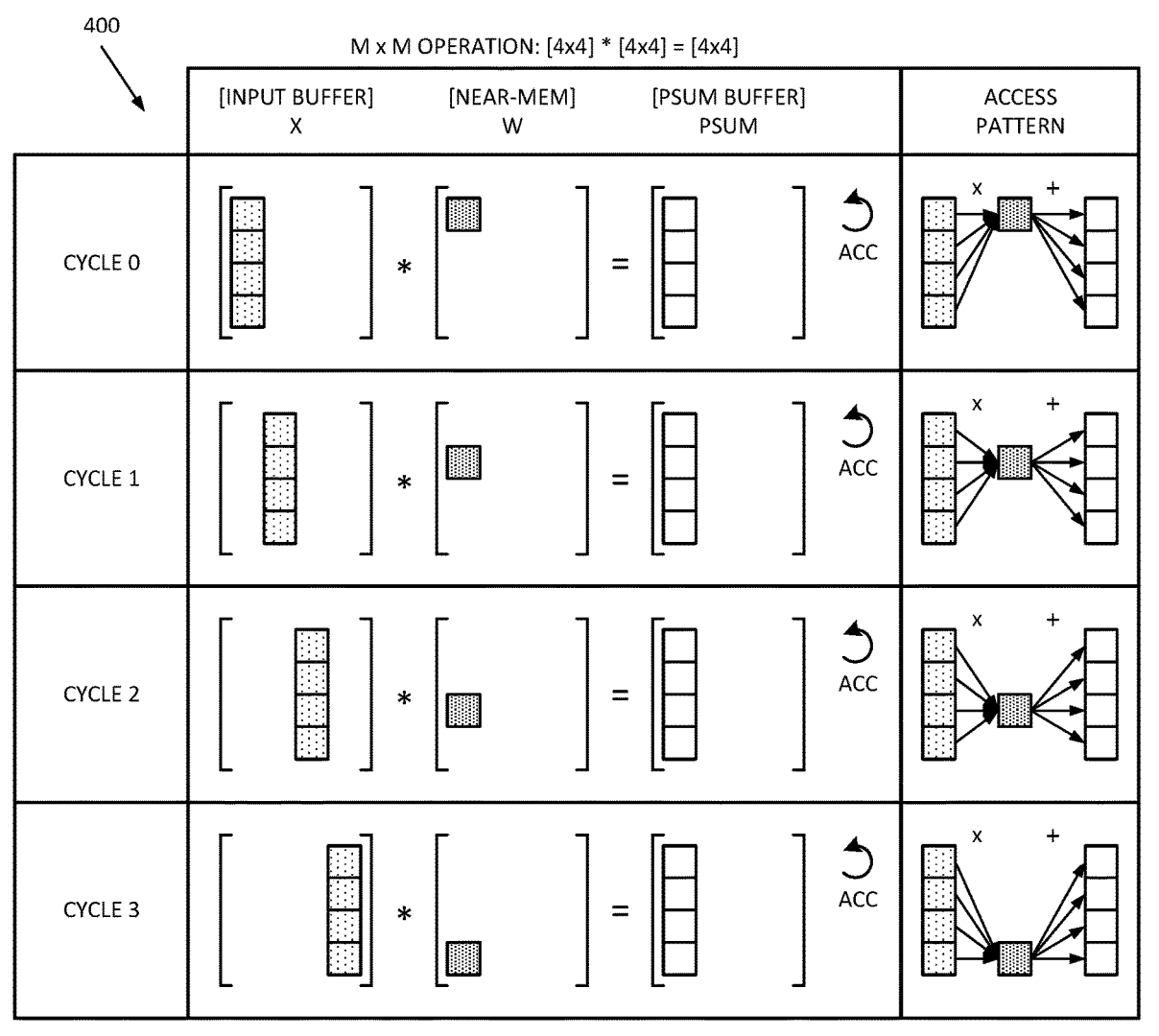

| | M x M OPERATION: [4x4] * [4x4] = [4x4] | | | |
|---|---|---|---|---|
| 400 → | [INPUT BUFFER] X | [NEAR-MEM] W | [PSUM BUFFER] PSUM | ACCESS PATTERN |
| CYCLE 0 | ▦ | ▦ | □ ACC | x + |
| CYCLE 1 | ▦ | ▦ | □ ACC | x + |
| CYCLE 2 | ▦ | ▦ | □ ACC | x + |
| CYCLE 3 | ▦ | ▦ | □ ACC | x + |

COMPUTE IN/NEAR MEMORY (CIM) CIRCUIT ARCHITECTURE FOR UNIFIED MATRIX-MATRIX AND MATRIX-VECTOR COMPUTATIONS

FIELD

Descriptions are generally related to compute-in/near-memory (CIM), and more particular descriptions are related to dynamically switching between matrix-matrix computations and matrix-vector computations with common CIM hardware.

BACKGROUND

Computer artificial intelligence (AI) has been built on machine learning, particularly using deep learning techniques. With deep learning, a computing system organized as a neural network computes a statistical likelihood of a match of input data with prior computed data. A neural network refers to a plurality of interconnected processing nodes that enable the analysis of data to compare an input to "trained" data. Trained data refers to computational analysis of properties of known data to develop models to use to compare input data.

Certain deep learning applications, such as those that apply single- or small-batch MLPs (multi-layer-perceptrons), RNNs (recursive neural networks), and LSTMs (long short-term memory—a recursive neural network with feedback), typically perform matrix-vector (M×V) multiplications, where a vector (or a narrow matrix) of neuron activations is multiplied with a neural network weight matrix.

Other deep learning application, such as those that apply CNNs (convolution neural networks, such as used for image processing, video processing, or computations or classification of a two-dimensional (2D) image) or large-batch MLPs, are generally mapped to matrix-matrix (M×M) multiplications, where a matrix is multiplied with a neural network weight matrix.

Dot-product operations for both M×V and M×M are performed by using an array of multiply-accumulate (MAC) arithmetic units. A two-dimensional (2D) systolic array of MAC units can provide a hardware solution with good performance and data reuse for M×M operations. A one-dimensional (1D) compute array approach is better suited to maximize data reuse of vector elements than a 2D systolic array. Thus, a 1D compute array provides good performance for M×V operations. Therefore, M×V multiplications typically map very well to 1D compute arrays, while M×M multiplications typically map well to 2D compute arrays.

However, performing M×V on a 2D systolic array causes the ratio of compute-to-memory bandwidth (BW) to drop drastically. Similarly, performing M×M on a 1D array serializes the highly parallelizable task of dot-product, causing performance and energy issues. As a result, traditional hardware approaches must be tailored to the primary operations to be performed, meaning either optimizing for M×M operation or M×V operation. Some system implementations perform both types of operations, resulting in a loss of performance because the hardware solution cannot provide maximum performance for the non-optimized workload.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 4A is a diagrammatic example of cycles of compute operations with a dynamically configurable CNM core configured for matrix-matrix computations.

FIG. 4B is a diagrammatic example of cycles of compute operations with a dynamically configurable CNM core configured for matrix-vector computations.

Figure 1:
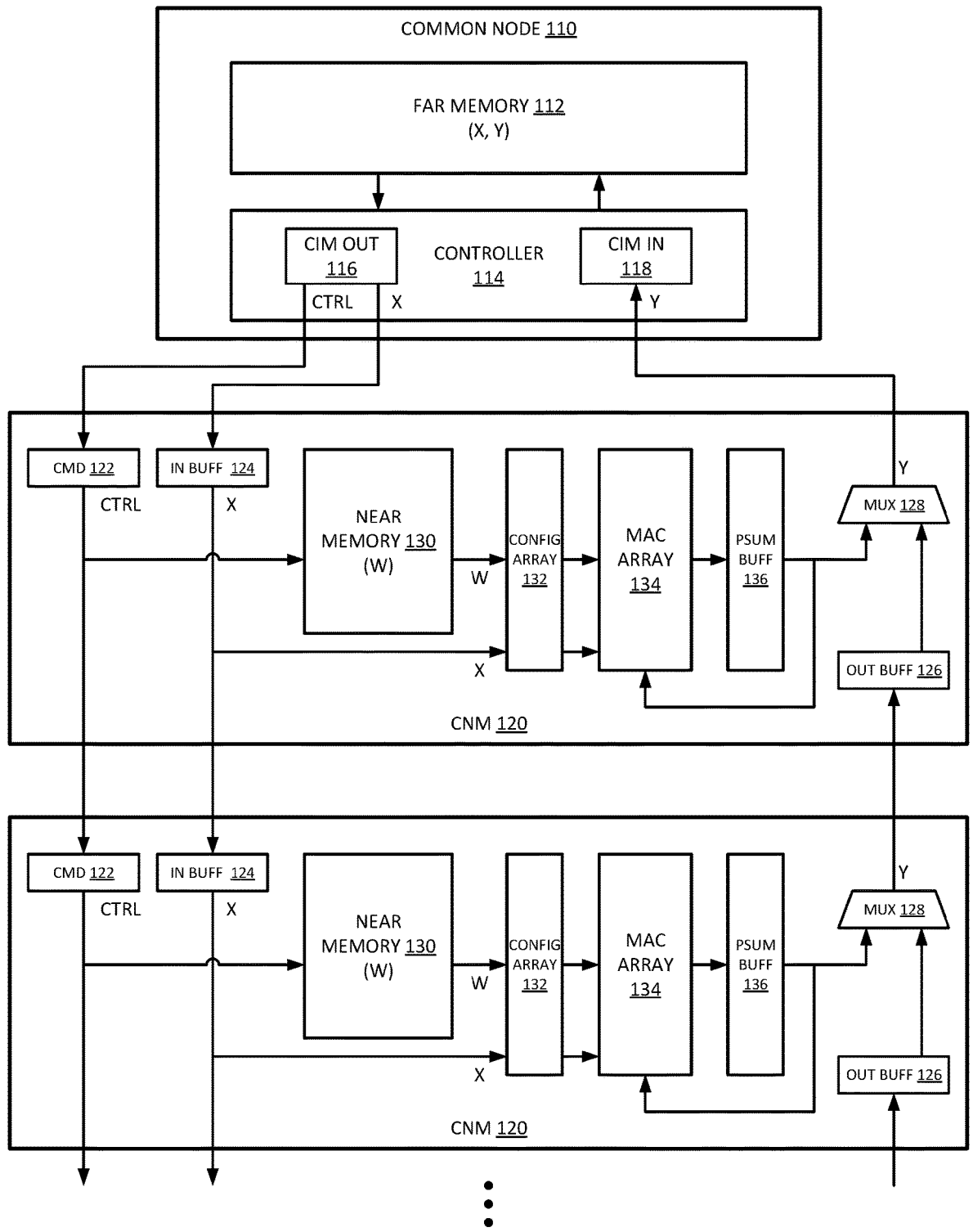
FIG. 1 is a block diagram of an example of a compute-in/near-memory system that performs computations with dynamically configurable compute near memory (CNM) circuits.

Descriptions of certain details and implementations follow, including non-limiting descriptions of the figures, which may depict some or all examples, and well as other potential implementations.

DETAILED DESCRIPTION

As described herein, a memory circuit includes a number of multiply-accumulate (MAC) circuits that are dynamically configurable. The MAC circuits or MAC arithmetic units can be configured to either compute an output based on computations of X bits of an input vector with a weight vector, or to compute the output based on computations of a single bit of the input vector with the weight vector. A first memory provides the input vector and a second memory provides the weight vector. Both the input vector and the weight vector can have the same number of bits (e.g., X bits), and the bits are delivered and computed against each other in different combinations, depending on the configuration. The MAC circuits are configured in an array, and the configuration can determine the operation of the array. In one example, the array is configured to compute an M×V (matrix-vector) calculation. In one example, the same array is configured to compute an M×M (matrix-matrix) calculation.

Dynamic configurability of the MAC array enables the same circuitry to optimize for either M×M or M×V operation. It will be understood that expressions related to optimization or optimize refer to improvement of performance relative to other configurations of the circuitry. Such expressions do not necessarily refer to absolute optimums, nor suggest that additional improvements could not be made. Optimization for an M×M operation, for example, refers to a configuration of the MAC array that improves performance of the array relative to a configuration that improves performance for M×M operation. Alternatively, it can be said that a particular configuration focuses on one type of operation or the other, or that a configuration is directed to operation of a particular type. With such configurability, the same circuitry can provide high performance for either type of operation. There will be a cost for the configuration, which may reduce performance as compared to a circuitry singularly optimized for a specific operation type, but which will provide improved performance relative to circuitry configured for one type of operation performing the other type of operation. In one example, the reconfigurable MAC array hardware is implemented on dedicated hardware such as a dedicated processor or accelerator.

Thus, the same circuitry can provide a 2D array configuration for 2D operation to compute deep learning matrix operation workloads for large amounts of neural network (NN) parameters for either inference or training tasks. Similarly, the same circuitry can provide a 1D array configuration favoring 1D compute operations. The computations can include 1D computations for single- or small-batch MLPs, RNNs, and LSTMs, where a vector (or a narrow matrix) of neuron activations is multiplied with NN weights. The computations can include 2D computations for CNNs or large-batch MLPs. In one example, the array configuration for either the 2D operation or the 1D operation can be in the form of a systolic array.

Systolic arrays are understood in the art as modular arrays of like elements with an architecture to propagate data and results through the elements of the array before returning to a primary processing unit or memory, and will not be described in detail. Many descriptions refer to systolic arrays, which will be understood as examples. Systolic array architectures can provide improved performance over nonsystolic array architectures in certain implementations, and will thus be used to describe examples below. Architectures other than systolic arrays can be used. Such architectures can use different types of elements or different arrangements of the elements.

Traditional approaches to neural network calculations include general purpose multicore hardware or dedicated accelerators. General purpose multicore approaches typically use SIMD (single instruction multiple data) type vectorized, distributed solutions for handling matrix operations, such as on GPU (graphics processing unit) hardware or coprocessor hardware. General purpose approaches provide adequate compute/bandwidth efficiency for matrix operations; however, they deliver lower performance compared to dedicated processors.

Dedicated accelerators (such as standalone chips, accelerators, FPGA (field programmable gate array) platforms, or other dedicated hardware) typically use arrayed multipliers such as 2D systolic array or a 1D compute array, depending on the chosen task and workload. Traditional accelerator solutions achieve very high energy-efficiency for a chosen task; however, they suffer compute efficiency or energy efficiency limitations as well as bandwidth limitations when switched to another task, such as switching from M×M to M×V operations. The limited efficiency means that in many implementations, both types of dedicated hardware will be used, increasing cost and lower overall efficiency as certain hardware inevitably remains unused in certain operations.

With the configurable MAC array, a system can implement a modular compute-near-memory (CNM) circuit block as a unified solution for both M×M and M×V operations providing high energy efficiency and good compute/bandwidth ratio. The CNM circuit block is an example of a compute in/near memory (CIM) circuit. The circuit can be a compute in memory circuit that includes a memory to perform a computation. A compute near memory circuit more specifically refers to a CIM circuit where the memory is a near memory of a multilevel memory architecture, which includes at least one level of volatile memory with faster access than a far memory level of volatile or nonvolatile memory. A CIM circuit is circuitry that enables the operation of a computation in a memory circuit without having to send the data to the processor. A CIM accelerator performs basic operations such as dot-product and absolute difference of vectors within the memory array directly, which reduces the need to transfer data to a compute engine or processor for a computation. The reduction in data movement between memory and processing units can be used to accelerate algorithms that are memory bandwidth limited. The reduction in data movement can also reduce data transfer energy overhead. CIM accelerators based on analog operations allow for lower cost computation and higher effective memory bandwidth from multibit data readout per column access.

Integrating lightweight reconfigurability circuits into CNM modules with a small near-memory and an array of MAC units enables two distinct matrix access patterns. As a result, an array of CNM cores can be configured dynamically to perform as a 2D array for M×M operations and as a 1D compute array for M×V operations. Localizing computation near a memory partition maximizes available local memory bandwidth and minimizes energy cost of the transmission of bits for computation. Reconfigurability of the modular CNM MAC units allows for balancing input, weight, and output reuse based on a selected hardware configuration or DNN (deep neural network) characteristics, or both, which enables high energy-efficiency gains for a variety of use cases.

The modular nature of the CNM array described enables configurable operation as well as configurable sizes for different applications. The configurable array can be applied in any number of computing devices ranging from servers to edge devices. The array is scalable to different applications and flexible for different system use.

FIG. 1 is a block diagram of an example of a compute-in memory system that performs computations with dynamically configurable compute near memory (CNM) circuits. System 100 provides an example of components of a system that can implement MAC operations on configurable hardware. System 100 includes common node 110 and a CNM array, represented by the two CNM units illustrated.

In one example, common node 110 includes far memory 112, which is a memory resource that has a longer access time than the near memory. Near memory is co-located with the hardware that will perform the computations and far memory has a longer access time for the computing hardware than the near memory. Typically, far memory 112 is larger than the near memory.

In one example, far memory 112 is an SRAM (synchronous random access memory) device. In one example, each near memory 130 is an SRAM device. In one example, near memory 130 is a register file of a memory device.

In one example, common node 110 includes control circuits and various miscellaneous arithmetic logic, or matrix operation logic, or a combination of arithmetic and matrix logic. The logic can be implemented as standalone hardware or part of a processor or programmable logic array. Controller 114 represents the logic and control circuits. Controller 114 can include interfaces to the compute in/near memory (CIM) hardware of the CNM array. CIM OUT 116 represents an interface to provide control (CTRL) and data (X) from far memory 112. Data X from far memory 112 represents one of the operands for the matrix computations to be performed by the CNM array. CIM IN 118 represents an interface to receive data (Y) from the CNM array. Data Y represents the computation result. The data can be stored in far memory 112.

Common node 110 includes a relatively large memory device as far memory 112 for storing X and Y. Near memory 130 is smaller than far memory 112. Controller 114 can be or include one or more control block for data communication and access to memories, as well as various arithmetic operations needed to implement the deep neural network (DNN) machine learning. The common-node arithmetic operations can include, but are not limited to, element-wise arithmetic operations, reduction, pooling, non-linearity operations, matrix transposing, data reshaping, compression, or a combination of these, or other operation, depending on the target workloads. The use of a configurable CNM array is compatible with any design choice of common node 110 and any arithmetic operation implemented in common node 110, as long as the downstream and upstream control is implemented with the CNM cores.

The CNM array includes multiple CNM units or CNM cores, identified as CNM 120.

Figure 2:
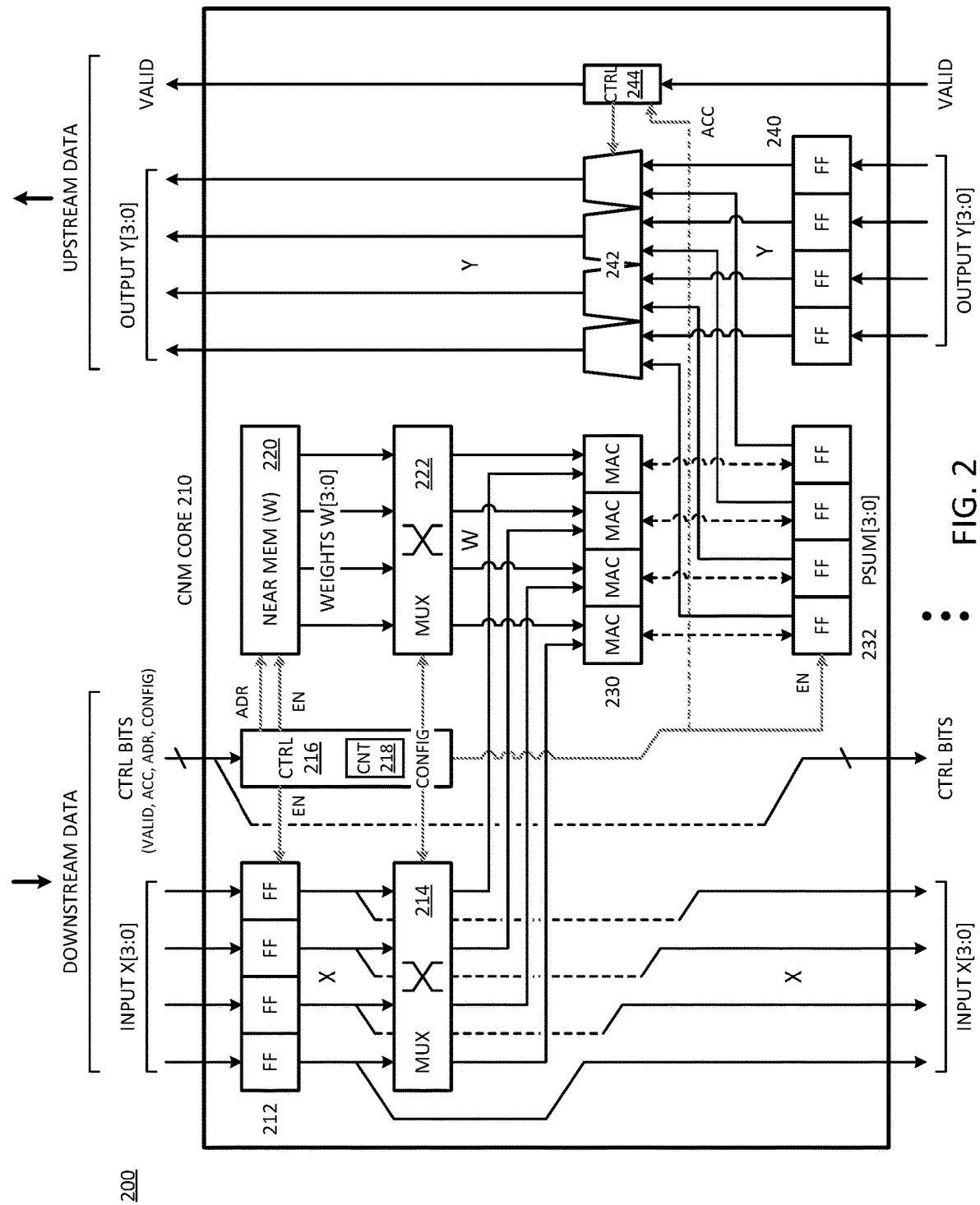
FIG. 2 is a block diagram of an example of a dynamically configurable CNM core.

System 100 provides a top-level layout for CNM blocks. For any problem size, matrices and vectors can be divided into tiles according to the CNM tile-size to implement M×V/M×M with highest possible utilization rate. The tile size of CNM 120 refers to the number of MAC units are included. Thus, the example of FIG. 2 is with 4 MAC units, giving a tile size of 4 and a value of M=4. V is less than M, such as V=1.

CNM refers to a compute near memory resource, in which compute units are integrated right by the memory or very closely to the memory. The compute units located near the memory provides fine-grained distributed compute and memory arrays. Whereas a typical access to memory would send a command and wait for data results at a processing core which performed all computations, certain computations can be made right at the memory with the CNM architecture, reducing the amount of data needed to be transferred from the memory to the processor. Rather, the memory itself has compute resources that can return a result of a computation instead of simply data to be used in a computation.

In the configuration of system 100, the system distributes weights to near memories 130 at CNM cores of CNMs 120. In one example, far memory 112 of common node 110 stores the input matrix (X). Similarly, output Y matrix is sent back to common node 110 to be processed or stored in far memory 112. In one example, all memory accesses within system 100 are tiled, with the same addresses used for all near memories 130 in every CNM 120. In one example, common node 110 generates the addresses or address information to near memories 130.

In one example, system 100 sends a small number of address and read/write control bits to the downstream data transfer along with the input X vector(s). In one example, CNMs 120 pass the same data downstream in a 1D systolic-array fashion. As a result of passing the same data downstream, the CNM core would only need lightweight control circuits to implement the control operations.

CNMs 120 include input buffer (In Buff) 124 for downstream communication and include output buffer (Out Buff) 126 for upstream communication. Downstream communication refers to communication from common node 110 to the CNM cores, or from a CNM core closer to common node 110 to a CNM core farther from common node 110. Similarly, upstream communication refers to communication from the CNM cores to common node 110, or from a CNM core farther from common node 110 to a CNM core closer to common node 110. In one example, 1D systolic array communication downstream and upstream between CNMs 120 are implemented in a flop-to-flop fashion. Therefore, input buffer 124 can be used for dual purposes: storing the input X vector(s) and transmitting the input X vector(s) to the next CNM core downstream. In one example, CNM 120 includes extra flops in CMD (command) 122 next to input buffer 124 to hold and transmit the address and control bits downstream.

CTRL from CIM OUT 116 represents control bits or command bits from common node 110. CNM 120 includes CMD or command 122, which represents a buffer for the control signals. The buffering and forwarding of the commands can be similar to what is described above with respect to input buffer 124 and input X. In one example, input X vector(s) can be provided from input buffer 124 to the control hardware indicated as config array 132. In one example, the command causes near memory 130 to generate weight matrix data W to config array 132.

Config array 132 configures MAC array 134 for the selected operation requested by common node 110. Config array 132 can configure the accumulation operation of MAC array 134. The accumulation operation causes the MAC array to perform accumulation for a certain number of operations before sending a final accumulation partial product to write to the PSUM Buff (partial sum buffer) 136. PSUM buffer 136 enables the sending of the partial sums upstream.

The sending of the partial sums upstream will be according to the access pattern for the type of operation (matrix-vector or matrix-matrix). CNM 120 transmits the partial sums upstream via an output Y port. In one example, the output Y port is driven by mux (multiplexer) 128, which selects either a local partial sum from PSUM Buff 136 or the partial sum of a downstream CNM received at OUT Buff 126. In one example, CNM 120 sends the partial sums immediately after 1 clock cycle in response to an accumulate signal (part of the control signals—not specifically illustrated in system 100, but shown in system 200). In one example, CNM 120 sends partial sums after a number of clock cycles equal to a value that indicates a location of the CNM unit in the array. The value that indicates the location of a particular CNM unit can be indicated by a number that also indicates the number of MAC units in a MAC array inside each CNM (in one implementation is can be referred to as a "tile size"). After the array size or tile size number of clock cycles, the CNM unit can output its partial sums.

After the final accumulation is completed, in one example, CNM 120 will send out the contents of its PSUM Buff 136 are reset PSUM Buff to 0. The reset after sending out the contents enables CNM 120 to be immediately ready for a new set of accumulation operations at the beginning of the next clock cycle. As such, MAC array 134 can be utilized every clock cycle for as long as there is input from the input pipeline. Input signals are buffered in IN Buff 124, and output signals are buffered in OUT Buff 126, which enables the array of CNM 120 to work in a pipelined fashion with a one clock cycle operational delay in between neighbor CNM cores in a 1D systolic array. In one example, if a sufficient amount of in-place accumulations is performed in each CNM 120, the output data transfer is collision free and no extra communication control is necessary.

Near memory 130 includes an array of memory cells or bitcells. In one example, the array is based on a dynamic random access memory (DRAM) technology. In one example, the array is based on a resistive-based random access memory (RAM) cell, such as resistive-RAM (Re-RAM), magnetoresistive RAM (MRAM), ferroelectric RAM (FeRAM), dielectric RAM, or other memory, three dimensional crosspoint (3 DXP) phase-change based RAM, or other byte-addressable random access memory technology. In one example, far memory 112 is based on SRAM. In one example, far memory 112 is based on one of the other technologies identified above.

In one example, common node 110 is a hardware platform including memory and circuitry near a processor. As such, what is labeled as far memory 112 in system 100 can be a cache or scratch-pad memory for the processor. Far memory 112 is "far" in system 100 relative to the MAC computations performed by the local memory or near memory 130 located near MAC array 134. As a cache or scratch-pad memory, far memory 112 could actually be a "near memory" with respect to the host processor or host processing unit of a computing device into which system 100 is incorporated.

A cache memory can refer to a level of memory in a memory hierarchy. Access to a cache memory may be constrained by a protocol that defines how the memory can be accessed, as well as when and where the access can occur. A scratchpad memory can refer to a memory that is similar to a cache, but can be randomly accessed at any time by the processor without specific access constraints that may apply to a cache (e.g., instruction set architecture (ISA) rules). The application of a CNM as described can apply to either a cache or a scratchpad memory. It will be understood that the application of a CNM to a cache may include the application of certain cache access rules.

In one example, system 100 is integrated on a common die with the host processor, where CNM 120 and its associated memory and MAC units are part of a hardware acceleration circuit. Rather than being integrated on a host processor die, the array of CNM 120 can be integrated on a hardware accelerator die that is either incorporated on a common substrate or motherboard with the host processor, or is included in a system on a chip with the host processor. Thus, the MAC arrays can be incorporated onto a die with the host processor or can be implemented off-chip from the processor as a hardware accelerator.

FIG. 2 is a block diagram of an example of a dynamically configurable CNM core. System 200 provides one example of a system in accordance with system 100 of FIG. 1. CNM core 210 represents a CNM unit or CNM core in accordance with CNM 120 of FIG. 1. In one example, CNM 210 can be integrated with a larger memory, such as an SRAM (static random access memory), DRAM (dynamic random access memory), or other type of memory.

CNM core 210 represents details of an example of a modular CNM core circuit. CNM core 210 includes input buffer 212 and input mux or input selector 214 to receive and distribute the input vector. CNM core 210 includes control (CTRL) 216 to configure the operation of the CNM core in accordance with received control signals. CNM core 210 includes near memory (near mem) 220 to store weight data (W) locally, and mux 222 to provide selected bits to the MAC array. CNM core 210 includes MAC array 230 and partial sum buffer (PSUM) 232. The partial sums can be fed back into MAC array 230 or provided to the output when computations are completed. CNM core 210 includes output buffer 240 to receive and buffer output data from downstream and selectors or output muxes 242 to either forward the local computations or forward the data received from downstream. Control (CTRL) 244 represents control functionality to configure the operation of output muxes 242.

In one example, MAC array 230 includes multiple MAC units. In one example, when system 200 is incorporated in a deep learning accelerator targeted for inference workloads, the MAC units and accumulation are implemented with integer arithmetic. In one example, when system 200 is incorporated in a deep learning accelerator is targeted for training workloads, the CNM compute units are built with floating-point arithmetic. Depending on the target deep learning workloads, a single choice of bit precision (e.g., INT32, full-precision floating-point, or other fixed bit precision), reconfigurable bit precision (e.g., INT8/4/2/1, or other reconfigurable precision), or mixed precision (e.g., bfloat16/INT8, or other) arithmetic based MAC units can be implemented in MAC array 230.

As illustrated, input buffer 212, near memory 220, MAC array 230, accumulation ("partial-sum" or "PSUM") buffers 232, and upstream output buffers 240 are matched to the design choice of M=4, shown as vectors of 4 elements. The 4 elements can be referred to as a tile size, which is a value that can be consistent with the input width and output array size. While the example is provided with 4 MAC elements or M=4, it will be understood that the system is scalable and can be made with more or fewer elements. The use of binary numbers in the array can provide improved efficiency (e.g., having M=2, 4, 8, 16, 32, . . . ). The use of a binary number is not necessary, and what is described should be applicable to any integer value greater than 1. In one example, there will be a number of CNM cores to match the number of MAC elements in the MAC array within each CNM core 210. Thus, system 200 illustrates an example of vector-of-4 elements for input X[3:0], stored data W[3:0], and MAC array accumulating on partial sums Psum[3:0], with output Y[3:0], with M=4 and the other elements being generally of the form [(M−1):0]. When a different number of MAC elements is used, the value of M will be correspondingly different. In one example, an element is one bit. In one example, an element is a multibit element. As a general example, for X MACs, there will be a pair of X elements, where each element can be a single bit or multiple bits.

Input buffer 212 receives and stores an input vector "X", illustrated as input X[3:0]. The data is referred to as downstream data because it is flowing downstream from the source of the command and the source of the input vector. In one example, the first CNM core in the 1D array receives input X from the far memory, and passes the data to the next core, which in turn passes the data to the subsequent core downstream in a 1D systolic fashion. Input vector X can be stored in input buffer 212, which in one example can be an array of flip flops (FF). When the input buffer is implemented as an array of flip flops, CNM core 210 can pass input X downstream to the next CNM core in a flop-to-flop fashion. In one example, input buffer 212 is implemented as an array of latches or a small size memory (such as a register file or SRAM). The implementation of input buffer 212 will depend on hardware requirements, matrix sizes, and available hardware budget. In one example, input buffer 212 can be implemented as a parallel input buffer. In an alternative example, input buffer 212 can be implemented as a serial input FIFO (first in, first out) buffer, depending on the buffer circuit choices, bandwidth, and available hardware resources. In the diagram, the solid lines illustrate the input passing to input buffer 212 and mux/selector 214. The dashed lines illustrate that the signals are also passed to an input passthrough to send downstream.

Near memory 220 stores a vector of local weights "W" to be buffered in the memory's read port. In one example, near memory 220 is implemented as a small sized memory with high local bandwidth. Examples of memories with high local bandwidth can include a register file (RF), or a small SRAM. Near memory 220 can have single access capability or multi-port access capability, depending on hardware and workload specifications. Thus, near memory 220 can be any of a variety of types of RF, such as 1RW, 1R1 W, or other multi-port memory. Near memory 220 can alternatively be any of a variety of small SRAM variants, such as 1RW, 1R1 W, or other multi-port memory.

In one example, near memory 220 functions as a sequential circuit in sync with the flops of input buffer 212 to pipeline the MAC operation. In one example, mux array 214 is connected to input buffer 212 and mux array 222 is connected to near memory 220. In one example, the input to the mux arrays is a vector, with a number of elements equal to the tile size. The output of the mux array can be the same length vector.

CNM core 210 receives control (CTRL) bits, such as a Valid signal, an accumulate (ACC) signal, an Address (ADR) signal, and one or more other configuration (CONFIG) bits. The Valid signal can be considered a "Go" signal for the hardware to perform an operation. The ACC signal can be considered a "Done" signal, meaning the operation is completed and the accumulated result can be sent. The ADR signal indicates an address of a memory location to use in the computation operations. The CONFIG bits can refer to any other signals used to configure the configuration array. The configuration array refers to the components that control the flow of the bits to MAC array 230.

For CNM 210, the system does not need to "configure" the circuitry, per se. In one example, with the setting of one or more configuration or control signals, the flow of bits from the input and the near memory to the MAC array will change, which changes the operation performed by the MAC array. The flow of bits into MAC array 230 as inputs to be calculated upon will change the logical operation performed by the MAC array, even as the MAC array operation is the same in each case. The bits used as inputs and the number of cycles used to compute can determine the different between an M×V and an M×M operation. In one example, the M×M operation ca be performed in multiple different ways. For example, the configuration of CNM core 210 can be set up to provide different bits to the MAC array for each cycle of operation. As an alternative, the operation of an M×V operation can be extended by repeating the M×V operation pattern multiple times to produce an M×M output. The flexibility of the approach allows customization of size and operation of the array depending on problem sizes and hardware budgets to use the same hardware for different operations.

In one example, the configuration signal (a configuration bit or bits) controls the access pattern of the mux arrays. CNM core 210 receives the control bits at control (CTRL) 216 to distribute the control signals. The logic for control 216 can be simple routing circuitry or a small controller or other circuitry with timing control for the control signals. In one example, control 216 passes an enable signal (EN) to input array 212 and near memory 220. The enable signal enables the operation of the input buffer and the near memory, and can be generated in response to a Valid signal being asserted from upstream. The enable signal can also enable the operation of partial sum buffer 232.

Control 216 also provides address information (ADR) to near memory 220 to identify the address of the vector or bit to read from the memory. In one example, control 216 provides an accumulation signal (ACC) to control 244, to control the operation of mux array 242. In one example, control 244 can be part of control 216. In one example, control 216 provides configuration to mux arrays 214 and 222 in accordance with the operation to be performed, namely, to configure the mux arrays to combine output vectors based on an M×M operation or an M×V operation.

In one example, mux arrays 214 and 222 implement two specific access patterns in response to the configuration signal(s): "all-to-all", and "one-to-all". These two specific access patterns are used in both M×M and M×V operations. In one example, the "all-to-all" access configuration causes the mux array to pass the vector as-is to its output. The passing of the vector as is transmits different weights to different MAC units. For example, where the tile size is chosen as 4, for an input vector of [X0, X1, X2, X3], the output vector of the mux-array is equal to [X0, X1, X2, X3]. In one example, the "one-to-all" access configuration causes the mux array to pass a single selected element to all output elements. Passing a single selected element can be referred to as broadcasting, where the element is chosen by a select bit "S" of bit-width log 2(tile_size) and transmitted to all compute units. For example, where tile size is chosen as 4, for an input vector of [X0, X1, X2, X3] and "S=01" to select element [X1] at position <1>, the output vector of the mux array is [X1, X1, X1, X1].

In one example, control 216 includes counter 218 to count from 0 to "tile_size−1". In one example, CNM core 210 uses counter 218 as an element pointer controlling the select bits "S" of the mux-arrays. In one example, for an M×V access pattern, counter 218 implements a pointer for mux array 214 connected to input buffer 212. In one example, for the M×V access pattern, the CNM core accesses near memory 220 every cycle. In one example, for an M×M access pattern, counter 218 implements element pointers for the W vector at the read-out port of mux array 222 connected to near memory 220. In one example, for the M×M access pattern, the CNM core accesses near memory 220 only once for all cycles of the operation, and continues to access near memory 220 in a contiguous fashion as new input X vectors continue to arrive every cycle, until an accumulate triggers CNM core 210 to pass the results upstream.

In one example, system 200 pipelines the output of CNM 210, to enable accumulation at a common node of the output of the specific CNM core with results from downstream CNM cores. Thus, system 200 can utilize multiple CNM cores 210, or an array of cores, to provide the results of an operation. The common node is not specifically shown in system 200, but couples to the array of CNM cores. With appropriate hardware in each CNM core, the accumulation from downstream could occur in each CNM core. It will be understood that such an implementation will require additional circuitry in each core to perform the accumulation. Such hardware is not needed in the CNM cores when the common node receives the outputs from each CNM core and performs the accumulation of all results. Each CNM core can be configured for 1D or 2D operation in accordance with what is described. Typically, an array of CNM cores 210 will all be configured for the same type of operation. With CNM core 210, a single hardware core can be used for either M×V or M×M problems. In both configurations, CNM core 210 can fully utilize MAC array 230. Utilizing all MAC units in every CNM core 210 for each cycle of computation maximizes the OPs/W (operations per second per watt) for the operation of system 200.

CNM core 210 enables reconfiguration between 2D and 1D matrix operations on a common hardware accelerator. MAC array 230 is a reconfigurable MAC array with compute near memory 220. Near memory 220 is close (co-located) with the MAC circuits for energy efficiency. In one example, MAC array 230 includes standard cell digital MAC units. In one example, MAC array 230 includes analog multiplier circuits.

In one example, system 200 can reconfigure CNM core 210 as a 1D systolic array for M×V operation. The array is not necessarily systolic. In one example, system 200 can reconfigure CNM core 210 as a 2D systolic array for M×M operation. The array is not necessarily systolic. The reconfiguration can be implemented by configuring mux array 214 connected to input buffer 212 and mux array 222 connected to the readout of near memory 220, as described above. The configuration for "one-to-all" and "all-to-all" can be implemented in a mutually exclusive way. Control 216 can provide the configuration to the mux arrays or other selector hardware.

As stated above, the MAC units of MAC array 230 can be fully utilized in both M×M and M×V configurations, and the accumulation buffer or PSUM buffer 232 accumulates the dot-product. In one example, PSUM buffer 232 is implemented with flip-flops. In one example, PSUM buffer 232 is implemented with latches. The accumulation bit-width, or the width of PSUM buffer 232 is chosen accordingly to the target problem sizes. While 4 elements are illustrated in system 200, it will be understood that PSUM buffer 232 may be wider than the number of bits of input. Thus, the 4 elements illustrated could each hold multiple bits. As a specific example, the 4 elements of PSUM buffer 232 could hold 32 bits for the 4 bit input illustrated in system 200.

In addition to the standard accumulation circuits, in one example, CNM core 210 includes extra quantization circuits when the output bit-width is smaller than input elements. In such a case, once the accumulations are completed, the partial sums can be directly transmitted to the upstream CNM module or common node. To ensure that data transfer occurs without a collision, in one example, the output Y vector received at output port 240 is buffered. Output port 240 can operate as an upstream input buffer for downstream units, and the upstream output is muxed with mux array 242 the current core's partial sums and the input upstream accumulation vector.

In one example, wiring and data-transmit energy can be minimized by reducing the upstream data to send only one element out of the core per cycle. Such a configuration reduces the wiring complexity of the design of system 200. In such an implementation, CNM core 210 would need to perform more in-place accumulation prior to writing output data back to memory to achieve full utilization of MAC array 230.

In one example, a single-bit Valid signal can control a read enable bit for near memory 220 and write enable for input buffer 212. In an example where CNM 210 includes additional flops or buffers for address bits, the Valid signal can also control the write enable for the address bits. In one example, the Valid bit indicates an incoming data transfer (input X and address bits) when the Valid bit is high. The dashed line from the control bits input of CNM core 210 to the output control bits of CNM core 210 indicates that the control bits, including the Valid bit, can be buffered similarly to the input buffers, enabling core-to-core transmission of the bits in system 200.

In one example, the accumulation signal is also received as a single-bit similar to the Valid bit. In one example, the accumulation signal indicates that the final accumulation of dot-product is to be performed. Once the ACC signal is received, CNM core 210 performs its final accumulation according to the configured access pattern (M×V, M×M) and transmits the partial sums to the upstream output Y port. For M×M, in one example, the partial sums are sent out immediately after 1 clock cycle when the ACC is received. For M×V, in one example, the partial sums are sent out after tile_size number of clock cycles occur (e.g., as counted by counter 218).

In one example, the ACC signal acts as a mux control for the upstream muxes of mux array 242, to control collision for upstream communication. In one example, the ACC signal generates a Valid signal for output Y data transfer, in a similar way that the input Valid signal controls transmission of downstream communication. In one example, the upstream valid signal controls the write enable for the output buffers. Since input and output signals are buffered, the cores, such as CNM core 210, can work in a pipelined fashion. With the pipelined operation, system 200 can have one clock cycle operational delay between neighboring CNM cores in the 1D array of cores of system 200. If a sufficient number of in-place accumulations is performed in each CNM core, then the output data transfer is collision free and no extra communication control would be necessary.

Figure 3A:
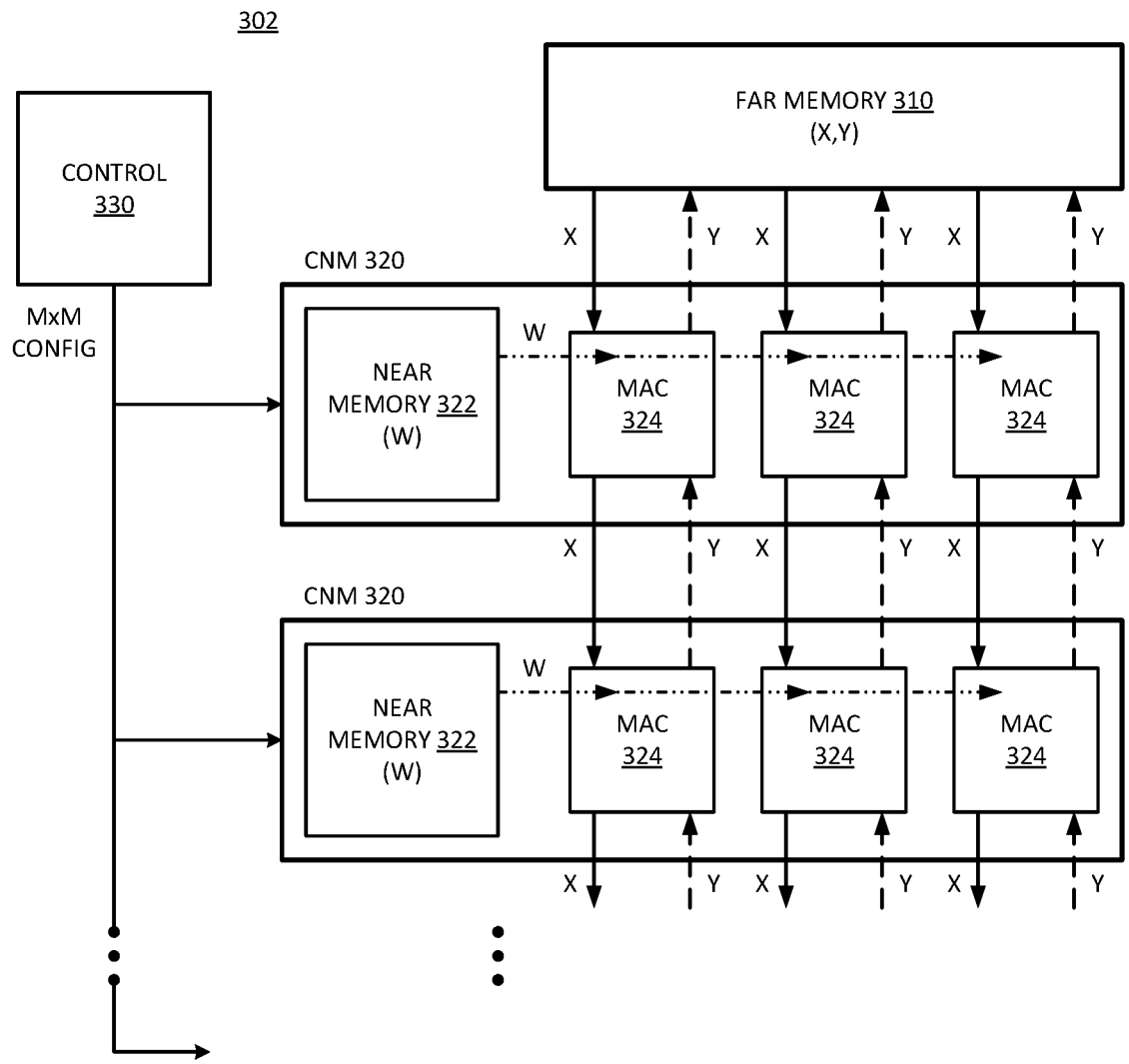
FIG. 3A is a block diagram of an example of a compute operation for a dynamically configurable CNM core configured for matrix-matrix computations.

FIG. 3A is a block diagram of an example of a compute operation for a dynamically configurable CNM core configured for matrix-matrix computations. System 302 illustrates a two dimensional (2D) systolic array for M×M operation for a system in accordance with system 100 of FIG. 1. The 2D systolic configuration of system 302 is a configuration of modular, reconfigurable hardware in accordance with system 200 of FIG. 2.

System 302 includes a large far memory 310 to store matrix operands (X) and matrix results (Y). Control 330 configures CNMs 320 for the M×M operation in system 302. M×M config represents one or more control signals that control hardware of CNM 320 to control the operation of the MAC units in response to the inputs. Control 330 represents hardware to provide the configuration to CNMs 320. It will be understood that control 330 can be implemented as least in part internally to CNM 320.

Far memory 310 broadcasts elements X to the 2D array of CNMs 320 in row-wise and column-wise fashion. The broadcasting of X is illustrated by separate solid lines to each MAC unit 324. Additionally, W is passed from near memory 322 to all MAC units 324. The configuration based on control 330 causes CNMs to receive and operate on the inputs in M×M fashion. The elements of X can be referred to as input activation data. The row/column elements are passed from one CNM 320 to the next in the same row/column-wise direction to maximize data reuse and amortize high energy cost of memory accesses.

Each compute unit CNM 320 performs MAC operations with MAC units 324 while the MACs accumulate partial sums. MAC units 324 represent an array of parallel MAC arithmetic units. CNM 320 performs the MAC operations on X received from far memory 310 and W accessed from near memory 322. W represents locally stored weight data. In system 302, CNMs 320 perform MAC operations as a 2D array, where a single W element is broadcasted within the CNM core to all MAC units 324 and multiplied with multiple X elements. In one example, near memory 322 is accessed only once for a tile-size number of X vectors received, and repeated in the same manner until the final accumulation is performed and Y is sent to far memory 310.

It will be understood that MAC units 324 include accumulation circuits that are not specifically shown in system 302. After many accumulations, MAC units 324 send the final dot-product results back to far memory 310 to be stored. System 302 is compatible with any of a variety of different arithmetic design choices, whether by system designer choice or to meet application requirements. For example, MAC units 324 can be implemented with integer arithmetic or floating-point arithmetic, and MAC units 324 can be based on a fixed bit precision, a reconfigurable bit precision, or a mixed precision. MAC units 324 are illustrated as MACs without a definitive bit precision. Similarly, system 302 is compatible with different vector sizes, and the bit width of the X vector and the W vector are assumed to match the arithmetic standard that is specified as a design choice for the compute units, and is not specifically indicated.

Figure 3B:
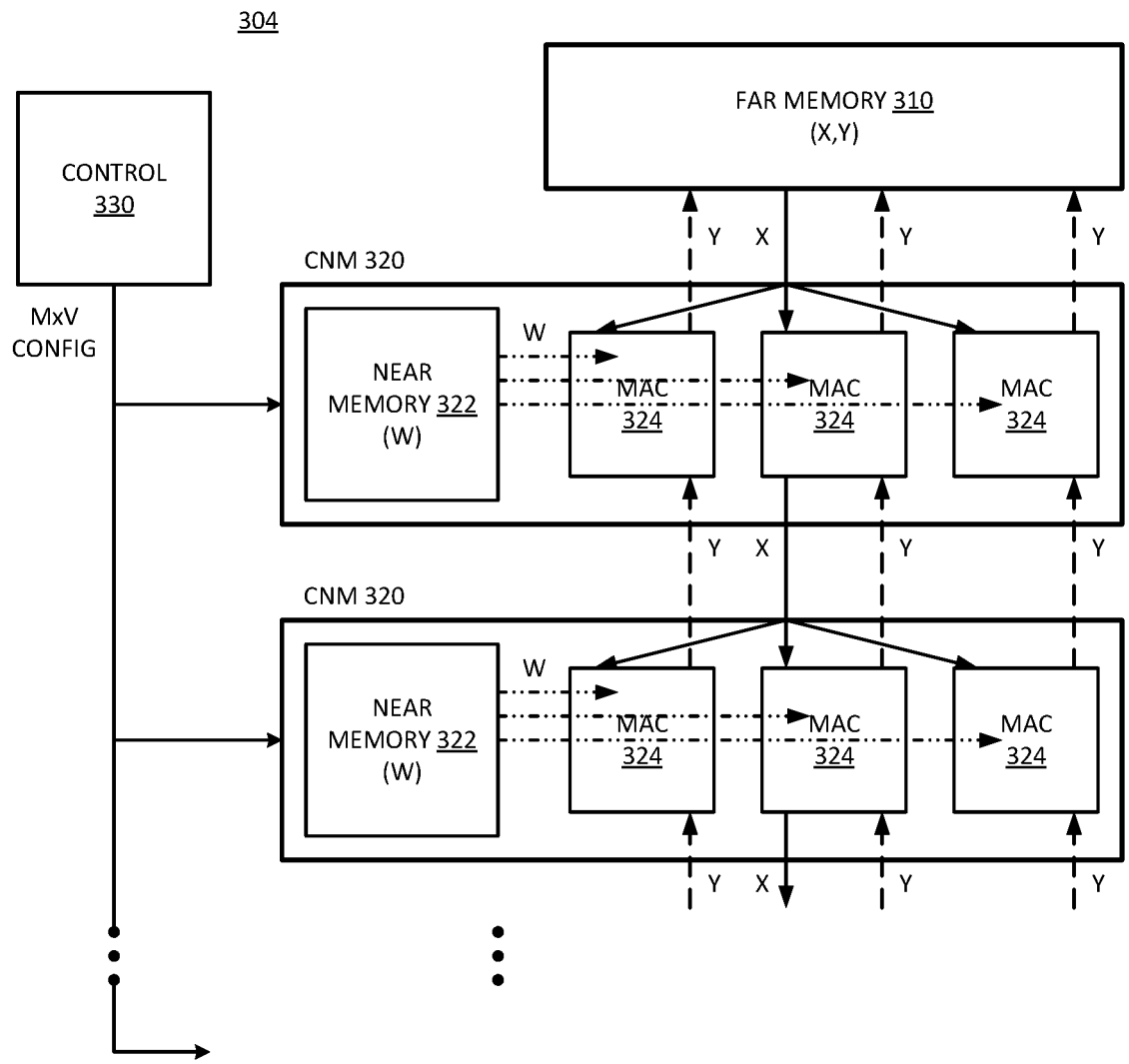
FIG. 3B is a block diagram of an example of a compute operation for a dynamically configurable CNM core configured for matrix-vector computations.

FIG. 3B is a block diagram of an example of a compute operation for a dynamically configurable CNM core configured for matrix-vector computations. System 304 illustrates a one dimensional (1D) systolic array for M×V operation for a system in accordance with system 100 of FIG. 1. The 1D systolic configuration of system 304 is a configuration of reconfigurable hardware in accordance with system 200 of FIG. 2. System 304 is an alternate configuration of the hardware of system 302. Thus, the descriptions of the hardware of far memory 310, CNM 320, near memory 322, MAC 324, and control 330 will not be repeated here, but are understood to be the same as for system 302.

Control 330 configures CNMs 320 for the M×V operation in system 304. M×V config represents one or more control signals that control hardware of CNM 320 to control the operation of the MAC units in response to the inputs. Whereas system 302 is configured as a 2D array, system 304 is configured as a 1D array for M×V operations. The 1D array approach can maximize data reuse of vector elements. Far memory 310 broadcasts elements X to the 1D array of CNMs 320. MAC units 324 perform computations based on X from far memory 310 and matrix operands accessed from the local memory banks of near memory 322. MAC units 324 are a 1D compute array to perform MAC operations where partials sums are accumulated, and the final dot-product is sent back to far memory 310 to be stored.

In one example, for the M×V configuration of system 304, control 330 configures CNMs 320 to perform as a 1D compute array where multiple W elements read from near memory 322 are distributed to parallel MAC units 324 and multiplied with a single X element received from far memory 310. The single X line from far memory 310 to CNMs 320 represents the use of the single X line, as opposed to different X lines as in system 302. System 304 can distribute different W elements to the MAC units for operation as shown by the parallel W lines. As with the 2D configuration of system 302, the 1D configuration of system 304 can fully utilize the MAC units.

Each compute unit CNM 320 performs MAC operations with MAC units 324 while the MACs accumulate partial sums. MAC units 324 represent an array of parallel MAC arithmetic units. CNM 320 performs the MAC operations on X received from far memory 310 and W accessed from near memory 322. W represents locally stored weight data.

MAC units 324 represent the MAC units and the accumulation circuits to perform the computation and accumulation. After many accumulations, MAC units 324 send the final dot-product results back to far memory 310 to be stored. System 304 is compatible with any of a variety of different arithmetic design choices, whether by system designer choice or to meet application requirements. For example, MAC units 324 can be implemented with integer arithmetic or floating-point arithmetic, and MAC units 324 can be based on a fixed bit precision, a reconfigurable bit precision, or a mixed precision. MAC units 324 are illustrated as MACs without a definitive bit precision. Similarly, system 304 is compatible with different vector sizes, and the bit width of the X vector and the W vector are assumed to match the arithmetic standard that is specified as a design choice for the compute units, and is not specifically indicated.

Application of the configuration of system 302 or the configuration of system 304 will depend on the specific workload to be computed. It will be understood that the different configurations will have different power results depending on the operation. The different configurations will provide better performance in different circumstances.

The operations performed will either produce a column of output (for M×M operation) per input, or a row of output (for M×V operation) per input. Despite the different outputs, it will be understood that the hardware does not have an orientation. Rather, the hardware simply generates outputs in response to inputs, and the outputs can be interpreted based on the type of operation to be performed.

It will be understood that the hardware of systems 302 and 304 will incur a penalty compared to traditional circuits that execute only M×M or M×V operations. For example, a circuit that performs only M×M operations will be more efficient than system 302 for M×M operations, although it would be less efficient if M×V operations would need to be performed whereas system 302 could be reconfigured to system 304 for M×V operations. Alternatively, a circuit that performs only M×V operations will be more efficient than system 304 for M×V operations, although it would be less efficient if M×M operations would need to be performed whereas system 304 could be reconfigured to system 302 for M×M operations.

FIG. 4A is a diagrammatic example of cycles of compute operations with a dynamically configurable CNM core configured for matrix-matrix computations. Table 400 illustrates M×M access patterns for a reconfigurable CNM core in accordance with system 100 and system 200.

Table 400 shows access pattern configurations for M×M operations for an example tile-size of 4. Elements of input X are stored at an input buffer and W is accessed from near memory. The partial sums are accumulated at the PSUM buffer. The example illustrated performs M×M operations of the form [4×4]*[4×4]=[4×4], where the input X received to the input buffer column by column is a matrix of size [4×4], the weight matrix accessed from near memory is of size [4×4], and the output Y accumulated on the PSUM buffer column by column is a matrix of size [4×4].

Figure 4B:
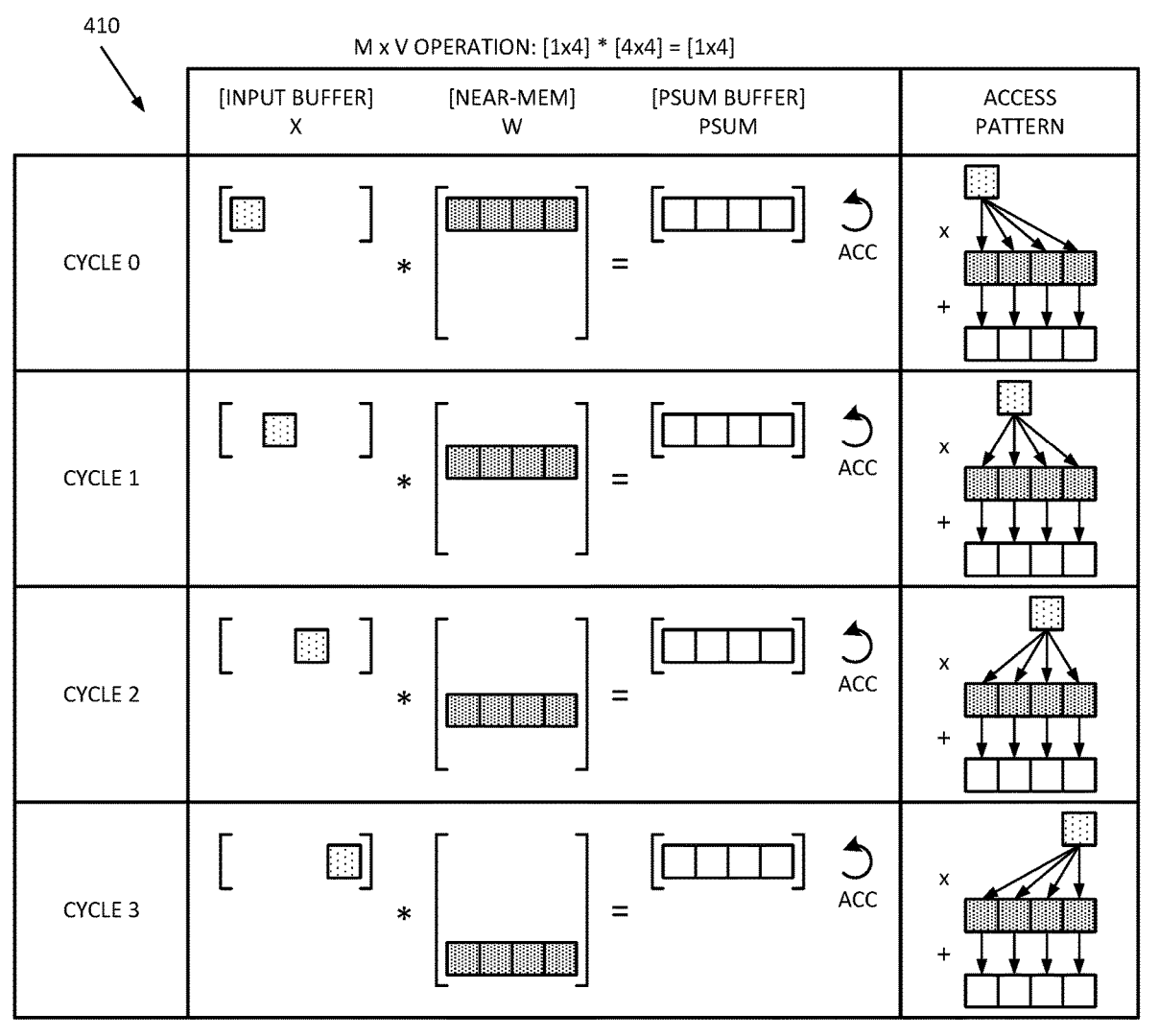

M×M operation is configured to the opposite access pattern of M×V, as illustrated in table 410 of FIG. 4B. In one example, a mux array connected to the input buffer is configured to an all-to-all access pattern. When the CNM cores are arrayed, the access pattern configures the CNM array as a 2D array. For the example tile size of 4, table 400 shows the dot-product of a single column of output Y matrix during M×M operation in 4 clock cycles. In cycle 0, input X's column 0 is multiplied by bit 0 of weight vector W. In cycle 1, input X's column 1 is multiplied by bit 1 of weight vector W. In cycle 2, input X's column 2 is multiplied by bit 2 of weight vector W. In cycle 3, input X's column 3 is multiplied by bit 3 of weight vector W. For this example, column 0 of W matrix stored in near-memory is accessed once at the initial clock and reused for 4 cycles. As a result, a column of X matrix is sent to MAC arrays as a vector at every cycle.

As such, each clock cycle implements a multiply and accumulate of a single W element with a column of X matrix. Partial sums are accumulated at the PSUM buffer at the end of every cycle. As a result, the product [4×4]*[4× 1]=[4×1] is implemented at 4 clock cycles in the CNM core, fully utilizing the MAC array at every cycle. For this example, the output matrix Y is computed in 16 cycles, by repeating the 4 clock cycle operation shown in FIG. 4A for contiguous W columns to compute contiguous columns of output matrix Y, as subsequent clock cycles would compute the input with different elements of the near memory until the entire matrix is computed. For example, cycles 4-7 would compute the second column of output Y with the next elements of W, continuing until completing the computation.

FIG. 4B is a diagrammatic example of cycles of compute operations with a dynamically configurable CNM core configured for matrix-vector computations. Table 410 illustrates M×V access patterns for a reconfigurable CNM core in accordance with system 100 and system 200.

Table 410 shows access pattern configurations for M×V operations for an example tile-size of 4. Elements of input X are stored at an input buffer and W is accessed from near memory. The partial sums are accumulated at the PSUM buffer. The example illustrated performs M×V operations of the form [1×4]*[4×4]=[1×4], where input X is a vector of size [1×4], the weight matrix accessed from near memory is of size [4×4], and the output Y accumulated on PSUM buffer is of size [1×4].

M×V operation is configured to the opposite access pattern of M×M, as illustrated in table 400 of FIG. 4A. In one example, a mux array connected to the input buffer is configured to a one-to-all access pattern. When CNM cores are arrayed, this access pattern configures the CNM array as a 1D array. For the example tile size of 4, table 410 shows the M×V operation implemented in CNM core at 4 clock cycles. In one example, the input X vector elements are accessed in 4 consecutive cycles and broadcast to the MAC arrays. In one example, the W matrix is stored in row-major format, and a single readout from the near memory provides a row of W matrix, which is a W row-vector of size [1× tile_size=4]. Therefore, at every consecutive cycle, a row of W matrix is read out and sent to the MAC array.

In cycle 0, a bit of input X is multiplied by row 0 of weight vector W. In cycle 1, a bit of input X is multiplied by row 1 of weight vector W. In cycle 2, a bit of input X is multiplied by row 2 of weight vector W. In cycle 3, a bit of input X is multiplied by row 3 of weight vector W. As a result, the product [1×4]*[4×4]=[1×4] is implemented at 4 clock cycles in the CNM core, fully utilizing the MAC array at every cycle. For this example, input X accesses to one element in every clock cycle, while reusing the same input X vector received at the initial clock cycle.

It will be observed that the M×V operation shown in table 410 can be repeated to implement M×M operation as well. The energy benefits and costs of performing repeated M×V operations versus M×M operation in accordance with table 400, depends on specific hardware choices such as CNM near-memory 130 and common-node far-memory 112 sizes, available BW, number of CNM cores in the 1D array, deep neural network parameters, and other considerations.

Figure 5:
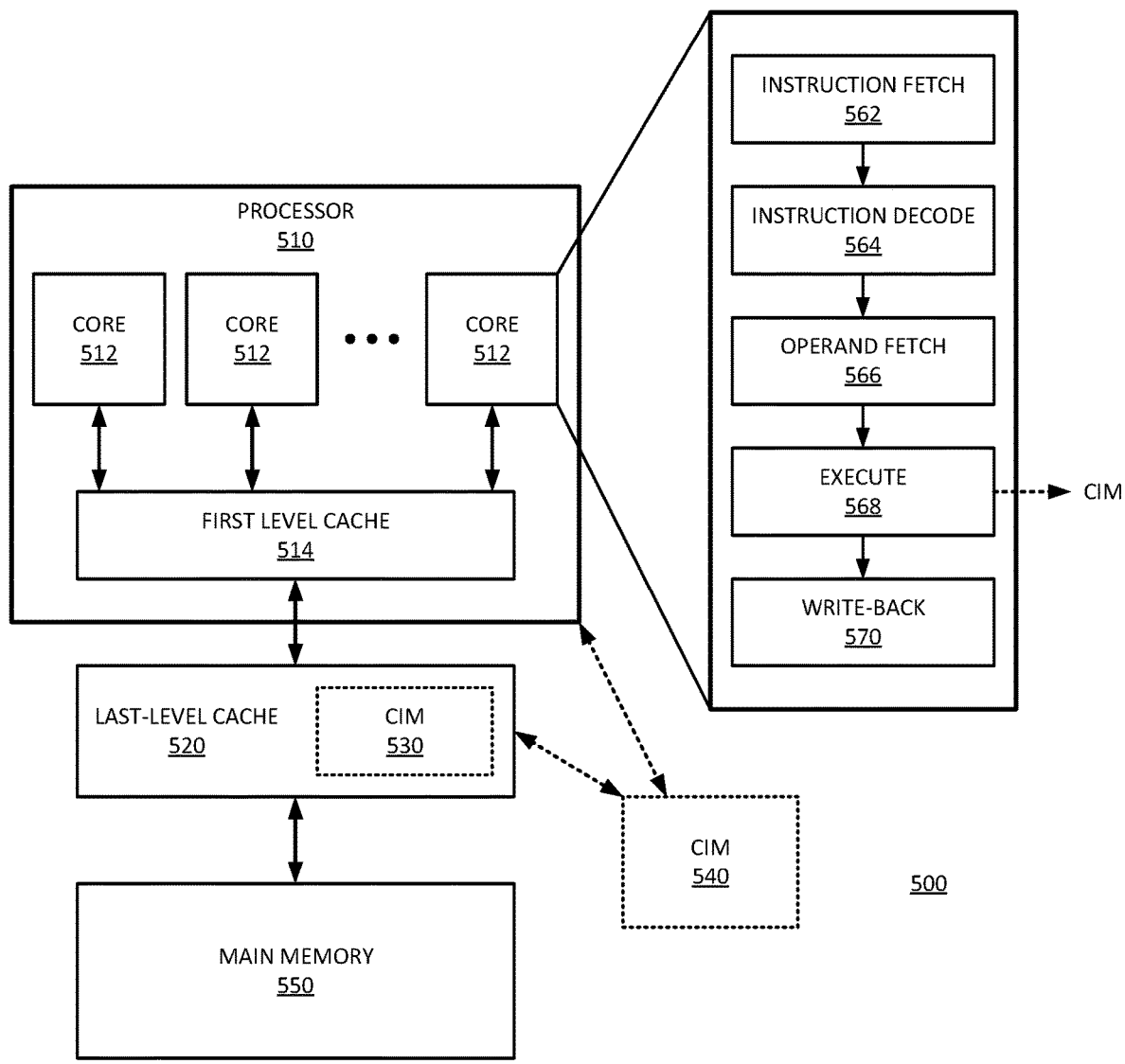
FIG. 5 is a block diagram of an example of a system with a processor and dynamically configurable compute-in/near-memory circuitry.

FIG. 5 is a block diagram of an example of a system with a processor and dynamically configurable compute-in/near-memory circuitry. System 500 can include a CIM circuit with reconfigurable CNM circuitry in accordance with any example described above. The CIM circuit can be a CIM accelerator for machine learning or other compute-intensive operation. An accelerator can be referred to as a coprocessor.

System 500 includes processor 510, which can be or include a general purpose CPU (central processing unit), a GPU (graphics processing unit), a DSP (digital signal processor) array, or other processor. Processor 510 represents a digital processor and can be referred to as a host processor. In one example, processor 510 includes multiple cores 512. Processor 510 executes applications or software programs that access data for compute-intensive operations.

In one example, processor 510 includes first level cache 514, which represents caching resources within the processor die or processor SOC (system on a chip) that provides physically close storage resources for host data. In one example, processor 510 includes multiple levels of on-chip/local cache, which are not explicitly shown. It will be understood that cache resources can be local to a specific core 512, shared by multiple cores 512, or a combination of shared cache resources and localized cache resources.

System 500 includes last-level cache 520. In one example, last level cache 520 is also on processor 510. In one example, last level cache 520 is off-chip from processor 510. Last level cache 520 is larger than first level cache 514 but takes longer to access. There may be any number of other cache layers between first level cache 514 and last level cache 520.

Main memory 550 represents system main memory. Main memory 550 is typically orders of magnitude larger than the cache resources, but takes much longer to access relative to the cache resources. Main memory 550 can include volatile memory resources that have indeterminate state when power is interrupted. Main memory 550 can include nonvolatile memory resources that maintain state even when power is interrupted to the memory. Caching resources are typically volatile, but can include nonvolatile memory resources.

System 500 includes a depiction of an instruction execution pipeline for core 512. In one example, each core 512 can include multiple execution pipelines (e.g., multithreading). The instruction pipeline is to be understood as a general explanation, and specific details are not provided. In one example, the instruction pipeline includes instruction fetch 562 where the core fetches the instruction to execute. Instruction decode 564 represents the decoding of the instruction by the core in preparation of the processor circuitry for execution. In one example, instruction decode 564 identifies the instruction as part of a command that triggers use of a CIM circuit for operation.

Operand fetch 566 represents the fetching or obtaining of the operands to be executed on for the instruction. In one example, the operand is a weight vector for a neural network, or other math function operand. In one example, the operands are in or are placed in register space associated with the execution pipeline. Execute 568 represents execution of the instruction on or with the operand(s). In one example, execution can include sending of the operation to CIM circuitry for execution. In one example, the instruction is sent to a processor ALU (arithmetic logic unit), which can trigger the execution by the CIM accelerator. Write-back 570 refers to writing execution results in a results register for return to memory, or for passing to another register for another execution. In the case of use of CIM circuitry, execution 568 and write-back 570 can include sending the operation to CIM circuitry, which will execute the operation and return a functional output, which can then be written back. The execution can include configuration of the CNM circuitry in accordance with any example described herein. Thus, the instruction that would traditionally require loading operands into an ALU or other computation engine within processor 510 can be sent to the CIM circuitry without having to read from memory, and then receiving a computation result from the CIM circuitry instead of from the local computation engine.

CIM 530 represents CIM circuitry implemented in last level cache 520. CIM 530 can be all or part of last level cache 520. In one example, last level cache 520 includes a memory array configured as a CIM circuit, and a memory array that does not include CIM circuitry. The system can selectively store data in the CIM-enabled memory array for CIM acceleration.

CIM 540 represents CIM circuitry that is separate from the cache architecture of system 500. Thus, CIM 540 represents a memory resource that is dedicated to the execution of CIM accelerated operations. Such a CIM memory can still include traditional access hardware to enable reading from the memory without performing a computation. CIM 530 and CIM 540 include CIM hardware to enable functional reads in accordance with any example described herein.

CIM 530 and CIM 540 include access paths from processor 510. When part of the cache architecture as CIM 530, the interconnection hardware can be the same as interconnection hardware for the cache devices. When not part of the cache architecture as CIM 540, the CIM interconnection can be similar or the same as a cache device, or main memory device, or other memory coupled to processor 510. CIM 530 and CIM 540 are coupled to main memory 550 (not specifically shown) to load operands for CIM acceleration operations.

In one example, invocation of a compute-intensive function triggers directing commands to the CIM accelerator. For example, processor 510 can include support in its instruction set architecture (ISA) for certain commands to trigger operation of a CIM accelerator. In one example, invocation of the CIM accelerator can be preceded by or associated with the loading of configuration information into accelerator. Such configuration information can, for example, define weights of internodal connections, define math functions to be performed, or other configuration. System 500 can load configuration information from system main memory or from nonvolatile mass storage, or a combination.

In one example, the CIM circuitry of either CIM 530 or CIM 540, or both, can include one or more levels of a neural network. In one example, after configuration of the CIM circuitry, the instruction pipeline applies input values to the configured neural network for processing. The CIM circuitry generates a resultant to write back to register space or system memory and the CIM circuitry can indicate completion of the processing to the executing thread that invoked the CIM circuitry. In one example, if the number of neural network levels or neurons per level that are physically implemented in the CIM circuitry is less than the number of levels/ neurons of the neural network to be processed, the processing through the neural network can be iterated by repeatedly loading the CIM circuitry for processing until all levels of the neural network have been processed.

Figure 6:
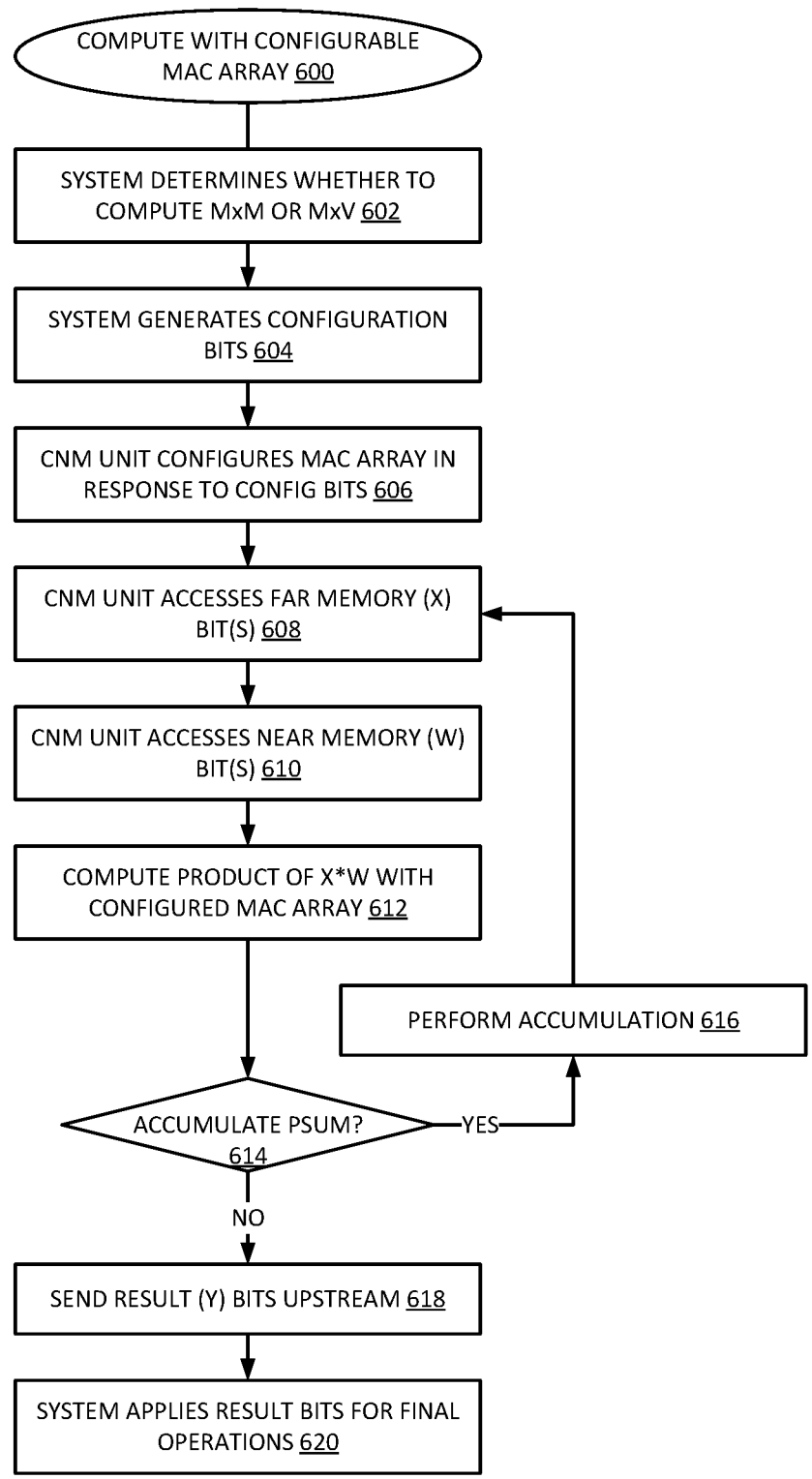
FIG. 6 is a flow diagram of an example of a process for in/near-memory computation with an architecture that can dynamically compute either matrix-matrix or matrix-vector calculations.

FIG. 6 is a flow diagram of an example of a process for in-memory computation with an architecture that can dynamically compute either matrix-matrix or matrix-vector calculations. Process 600 represents a process for MAC computations with a configurable MAC array in accordance with any description herein. In one example, a system including the configurable MAC array determines whether to perform M×M or M×V computations, block 602. The determination can be in accordance with the matrix workload for the neural network operations to be performed. In one example, the system generates configuration bits, block 604, such as with a primary controller sending control bits that control logic on the CNM cores will use to configure the operations.

In one example, the CNM units configure the MAC array in response to the configuration bits, block 606. The CNM unit accesses far memory bit or bits, input X, block 608. The CNM unit also accessed near memory bit or bits, input W, block 610. The CNM unit computes a product of X*W with the configured MAC array, block 612.

In one example, the MAC array continues to perform multiply and accumulate operations until a completion signal is received. If the CNM unit is to continue to accumulate partial sum information, block 614 YES branch, the MAC unit performs the accumulation, block 616, and returns to accessing the far memory bit or bits, block 608. It will be understood that in the repetition after the accumulation, accessing the far memory or the near memory could refer to accessing the data from a buffer rather than again accessing the specific memory device.

Once all accumulation operation is completed, block 614 NO branch, the CNM unit can send the result data bits, vector Y, upstream, block 618. The system can apply the result bits for final operations to generate the desired output, block 620.

Figure 7:
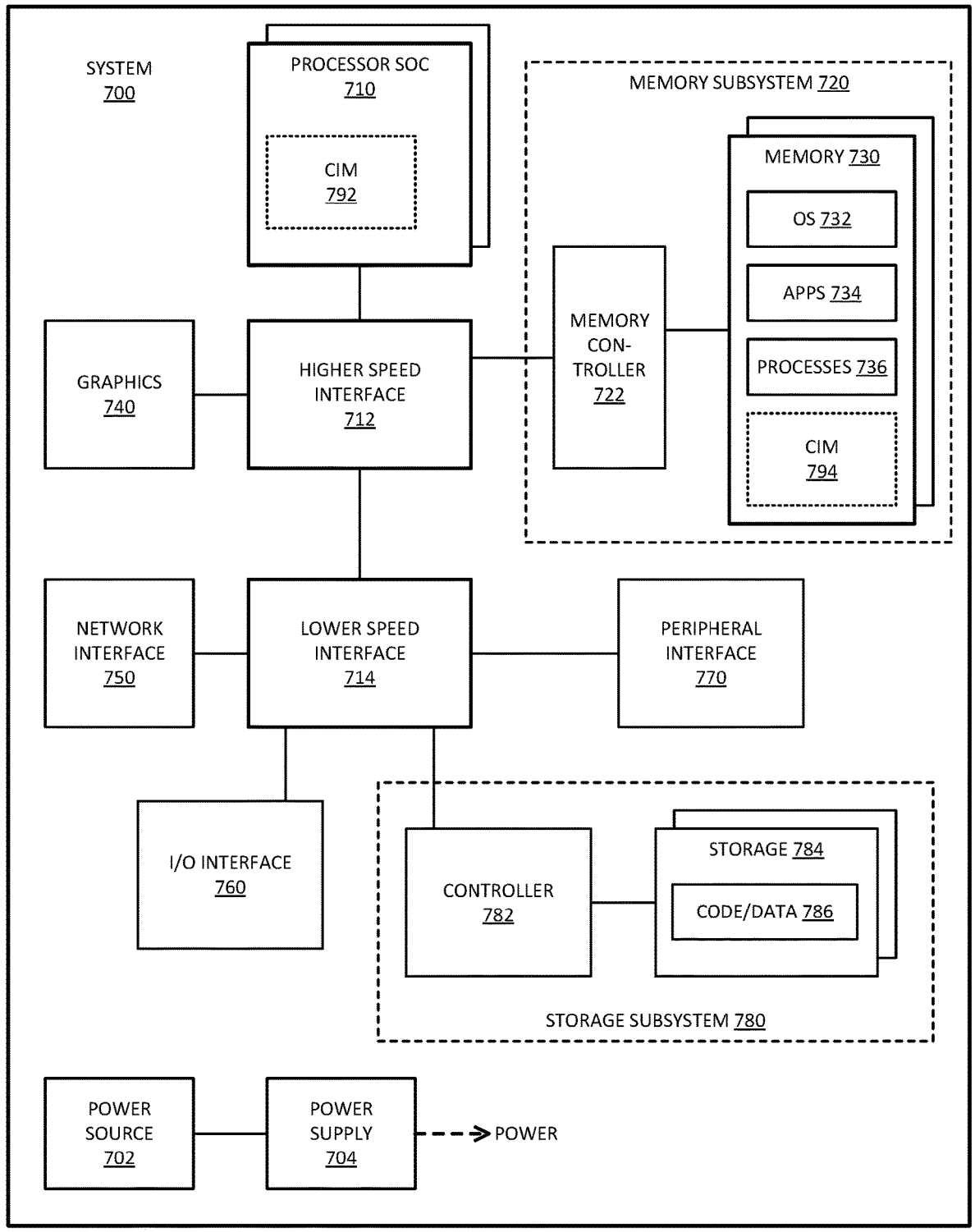
FIG. 7 is a block diagram of an example of a computing system in which compute-in/near-memory (CIM) operations with a dynamically configurable MAC array can be implemented.

FIG. 7 is a block diagram of an example of a computing system in which compute-in-memory (CIM) operations with a dynamically configurable MAC array can be implemented. System 700 represents a computing device in accordance with any example herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

In one example, system 700 includes CIM circuitry. The CIM circuitry includes reconfigurable CNM circuitry in accordance with any example described herein. One example of CIM circuitry can be CIM 792, which is represented as CIM circuitry included in processor SOC 710. CIM 792 can be or include CIM circuitry in a memory device on the processor SOC substrate or die. For example, CIM 792 can be part of a cache on processor SOC 710. Another example of CIM circuitry can be CIM 794, which is represented as CIM circuitry included in memory subsystem 720. More specifically, CIM 794 is illustrated as part of memory 730, referring to the memory resources of system 700. CIM 794 represents CIM circuitry that can be included as a memory resource to which processor SOC 710 can offload compute-intensive operations. The compute-intensive operations can include M×M operations and M×V operations. The configurable CNM circuitry enables CIM 792 or CIM 794 to be configurable for both types of workloads. The circuitry is dynamically configured in accordance with the operations to be performed.

System 700 includes processor SOC 710 (referred to subsequently as "processor 710"), which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 can include a single core or multiple cores. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
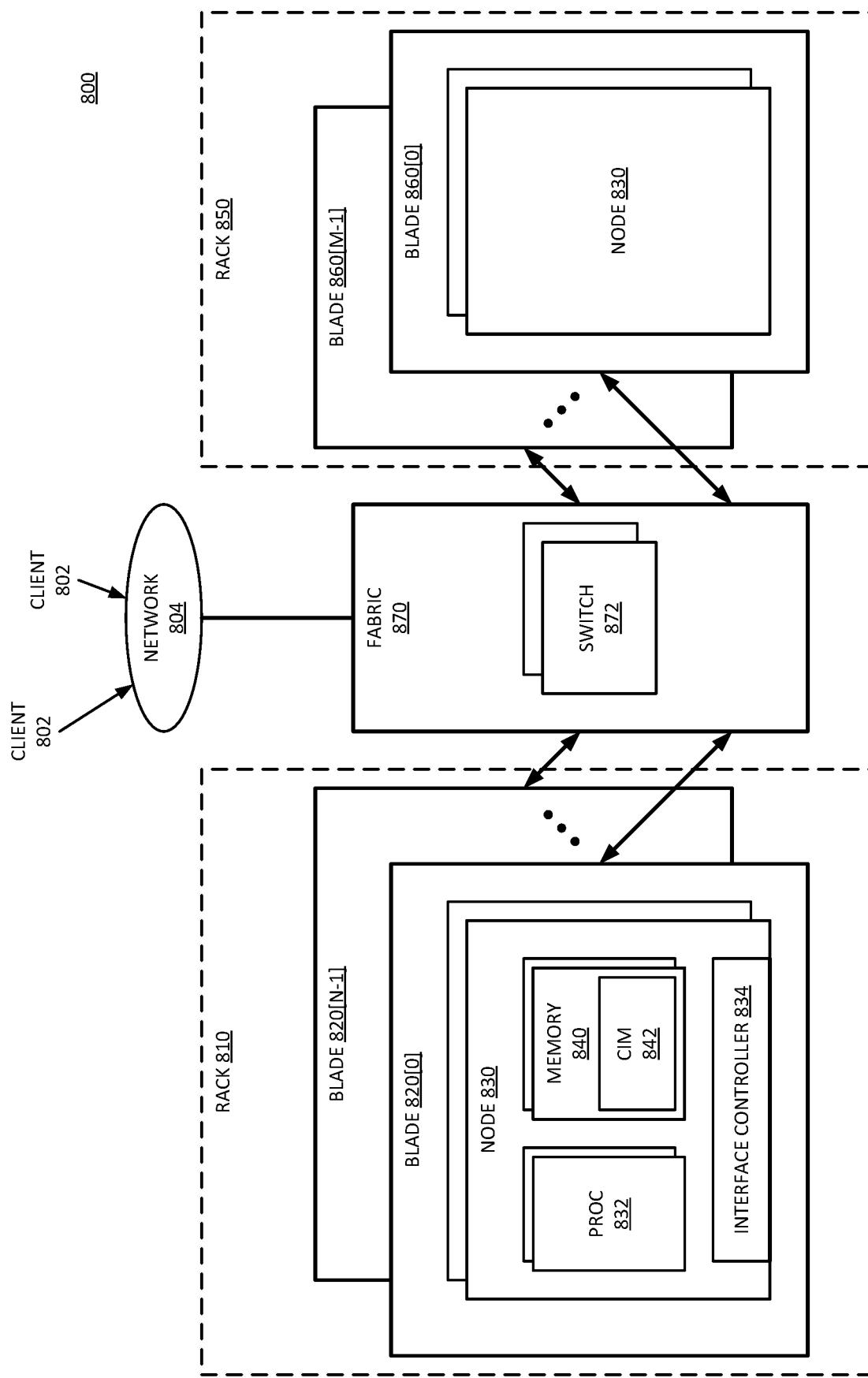
FIG. 8 is a block diagram of an example of a multi-node network in which compute-in/near-memory (CIM) operations with a dynamically configurable MAC array can be implemented.

FIG. 8 is a block diagram of an example of a multi-node network in which compute-in-memory (CIM) operations with a dynamically configurable MAC array can be implemented. System 800 represents a network of nodes in accordance with any example described herein. In one example, system 800 represents a data center. In one example, system 800 represents a server farm. In one example, system 800 represents a data cloud or a processing cloud.

Node 830 includes memory 840, which in one example includes CIM 842. The CIM circuitry includes reconfigurable CNM circuitry in accordance with any example described herein. With CIM 842, memory 840 becomes a computation resource for node 830. More specifically, CIM 842 enables node 830 to provide improved processing of workloads that are both memory/data intensive as well as compute intensive. Instead of moving data back and forth from memory to processor, CIM 842 enables the memory to perform computations and return a functional result to the calling processor 832. CIM 842 can be implemented as a standalone resource within memory 840 or as an accelerator. In one example, CIM 842 is implemented as a cache on processor 832. In one example, CIM 842 is a separate blade as an accelerator for a blade of processor resources. The configurable CNM circuitry enables CIM 842 to be configured for either M×M operations or M×V operations, depending on the type of workload to be executed. The circuitry is dynamically configured in accordance with the operations to be performed.

One or more clients 802 make requests over network 804 to system 800. Network 804 represents one or more local networks, or wide area networks, or a combination. Clients 802 can be human or machine clients, which generate requests for the execution of operations by system 800. System 800 executes applications or data computation tasks requested by clients 802.

In one example, system 800 includes one or more racks, which represent structural and interconnect resources to house and interconnect multiple computation nodes. In one example, rack 810 includes multiple nodes 830. In one example, rack 810 hosts multiple blade components 820. Hosting refers to providing power, structural or mechanical support, and interconnection. Blades 820 can refer to computing resources on printed circuit boards (PCBs), where a PCB houses the hardware components for one or more nodes 830. In one example, blades 820 do not include a chassis or housing or other "box" other than that provided by rack 810. In one example, blades 820 include housing with exposed connector to connect into rack 810. In one example, system 800 does not include rack 810, and each blade 820 includes a chassis or housing that can stack or otherwise reside in close proximity to other blades and allow interconnection of nodes 830.

System 800 includes fabric 870, which represents one or more interconnectors for nodes 830. In one example, fabric 870 includes multiple switches 872 or routers or other hardware to route signals among nodes 830. Additionally, fabric 870 can couple system 800 to network 804 for access by clients 802. In addition to routing equipment, fabric 870 can be considered to include the cables or ports or other hardware equipment to couple nodes 830 together. In one example, fabric 870 has one or more associated protocols to manage the routing of signals through system 800. In one example, the protocol or protocols is at least partly dependent on the hardware equipment used in system 800.

As illustrated, rack 810 includes N blades 820. In one example, in addition to rack 810, system 800 includes rack 850. As illustrated, rack 850 includes M blades 860. M is not necessarily the same as N; thus, it will be understood that various different hardware equipment components could be used, and coupled together into system 800 over fabric 870. Blades 860 can be the same or similar to blades 820. Nodes 830 can be any type of node and are not necessarily all the same type of node. System 800 is not limited to being homogenous, nor is it limited to not being homogenous.

For simplicity, only the node in blade 820[0] is illustrated in detail. However, other nodes in system 800 can be the same or similar. At least some nodes 830 are computation nodes, with processor (proc) 832 and memory 840. A computation node refers to a node with processing resources (e.g., one or more processors) that executes an operating system and can receive and process one or more tasks. In one example, at least some nodes 830 are server nodes with a server as processing resources represented by processor 832 and memory 840. A storage server refers to a node with more storage resources than a computation node, and rather than having processors for the execution of tasks, a storage server includes processing resources to manage access to the storage nodes within the storage server.

In one example, node 830 includes interface controller 834, which represents logic to control access by node 830 to fabric 870. The logic can include hardware resources to interconnect to the physical interconnection hardware. The logic can include software or firmware logic to manage the interconnection. In one example, interface controller 834 is or includes a host fabric interface, which can be a fabric interface in accordance with any example described herein.

Processor 832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 840 can be or include memory devices and a memory controller.

Reference to memory devices can apply to different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (Double Data Rate version 3, JESD79-3, original release by JEDEC (Joint Electronic Device Engineering Council) in June 2007), DDR4 (DDR version 4, JESD79-4, initial specification published in September 2012 by JEDEC), LPDDR3 (Low Power DDR version 3, JESD209-3, August 2013 by JEDEC), LPDDR4 (LPDDR version 4, JESD209-4, originally published by JEDEC in August 2014), WI02 (Wide I/O 2 (WideIO2), JESD229-2, originally published by JEDEC in August 2014), HBM (High Bandwidth Memory, JESD235, originally published by JEDEC in October 2013), DDR5

(DDR version 5, currently in discussion by JEDEC), LPDDR5 (LPDDR version 5, JESD209-5, originally published by JEDEC in February 2019), HBM2 (HBM version 2, currently in discussion by JEDEC), or others or combinations of memory technologies, and technologies based on derivatives or extensions of such specifications.

In general with respect to the descriptions herein, in one example, an apparatus includes: a first memory to provide an input vector having a width of X elements; and a multiply-accumulate (MAC) array on chip with the first memory, the MAC array including a second memory to store a weight vector; and X MAC circuits dynamically configurable either to compute an output based on computations of the X elements of the input vector with the weight vector, or to compute the output based on computations of a single element of the input vector with the weight vector.

In one example, the first memory comprises a static random access memory (SRAM). In one example, the second memory comprises a register file. In one example, the second memory comprises a static random access memory (SRAM). In one example, the MAC array is on a common memory die with the first memory, wherein the first memory is a cache memory for a processor. In one example, the MAC array is on a common memory die with the first memory, wherein the first memory is a scratchpad memory for a processor. In one example, the MAC array is within a system on a chip with the first memory, wherein the first memory is a cache memory for a processor. In one example, the MAC array is within a system on a chip with the first memory, wherein the first memory is a scratchpad memory for a processor. In one example, the MAC array further comprising: a multiplexer (mux) to provide alternate paths between the first memory and the MAC array; and a mux controller to control the mux to select between the alternate paths. In one example, the mux controller is to control the mux for one input vector element to all X MAC circuits for a one-dimensional (1D) M×V computation. In one example, the mux controller is to control the mux for X different input vector elements to the X MAC circuits, respectively, for a two-dimensional (2D) M×M computation.

In general with respect to the descriptions herein, in one example, a system includes: a scratchpad memory of a processing unit to provide an input vector having a width of X elements; and a hardware accelerator coupled to the scratchpad memory of the processing unit, including compute-in/near-memory (CIM) circuitry having a multiply-accumulate (MAC) array, the MAC array including a local memory to store a weight vector; and X MAC circuits dynamically configurable either to compute an output based on computations of the X elements of the input vector with the weight vector, or to compute the output based on computations of a single element of the input vector with the weight vector.

In one example, the cache or scratch-pad memory comprises a static random access memory (SRAM). In one example, the local memory comprises a register file. In one example, the local memory comprises a static random access memory (SRAM). In one example, the hardware accelerator is integrated on a common memory die with the cache or scratchpad memory. In one example, the hardware accelerator is integrated on a system on a chip with the cache or scratchpad memory. In one example, the MAC array further comprising: a multiplexer (mux) to provide alternate paths between the cache or scratch-pad memory and the MAC array; and a mux controller to control the mux to select between the alternate paths. In one example, the mux controller is to control the mux for one input vector element to all X MAC circuits of the MAC array for a one-dimensional (1D) M×V computation. In one example, the mux controller is to control the mux for X different input vector elements to the X MAC circuits of the MAC array, respectively, for a two-dimensional (2D) M×M computation. In one example, wherein: the processing unit comprises a multicore host processor device; the system further comprises a display communicatively coupled to a host processor; the system further comprises a network interface communicatively coupled to a host processor; or the system further comprises a battery to power the system.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a first memory to provide an input vector having a width of X elements, where X is an integer; and
a multiply-accumulate (MAC) array on chip with the first memory, the MAC array including
a second memory to store a weight matrix; and
X MAC circuits to dynamically switch between a first configuration and a second configuration in response to a control signal,
wherein in the first configuration, the X MAC circuits are to perform a matrix-matrix computation with the X elements of the input vector and a single element of the weight matrix; and
wherein in the second configuration, the X MAC circuits are to perform a matrix-vector computation with a single element of the input vector and X elements of the weight matrix.

2. The apparatus of claim 1, wherein the first memory comprises a static random access memory (SRAM).

3. The apparatus of claim 1, wherein the second memory comprises a register file.

4. The apparatus of claim 1, wherein the second memory comprises a static random access memory (SRAM).

5. The apparatus of claim 1, wherein the MAC array is on a common memory die with the first memory, wherein the first memory is a cache memory for a processor.

6. The apparatus of claim 1, wherein the MAC array is on a common memory die with the first memory, wherein the first memory is a scratchpad memory for a processor.

7. The apparatus of claim 1, wherein the MAC array is within a system on a chip with the first memory, wherein the first memory is a cache memory for a processor.

8. The apparatus of claim 1, wherein the MAC array is within a system on a chip with the first memory, wherein the first memory is a scratchpad memory for a processor.

9. The apparatus of claim 1, the MAC array further comprising:
a multiplexer (mux) to provide alternate paths between the first memory and the MAC array; and
a mux controller to control the mux to select between the alternate paths.

10. The apparatus of claim 9, wherein the mux controller is to control the mux for one input vector element to all X MAC circuits for a one-dimensional (1D) matrix-vector (M×V) computation.

11. The apparatus of claim 9, wherein the mux controller is to control the mux for X different input vector elements to the X MAC circuits, respectively, for a two-dimensional (2D) matrix-matrix (M×M) computation.

12. A system, comprising:
a scratchpad memory of a processing unit to provide an input vector having a width of X elements, where X is an integer; and
a hardware accelerator coupled to the scratchpad memory of the processing unit, including compute near memory (CNM) circuitry having a multiply-accumulate (MAC) array, the MAC array including
a local memory to store a weight matrix; and
X MAC circuits to dynamically switch between a first configuration and a second configuration in response to a control signal,
wherein in the first configuration, the X MAC circuits are to perform a matrix-matrix computation with the X elements of the input vector and a single element of the weight matrix; and
wherein in the second configuration, the X MAC circuits are to perform a matrix-vector computation with a single element of the input vector and X elements of the weight matrix.

13. The system of claim 12, wherein the scratchpad memory comprises a static random access memory (SRAM).

14. The system of claim 12, wherein the local memory comprises a register file.

15. The system of claim 12, wherein the local memory comprises a static random access memory (SRAM).

16. The system of claim 12, wherein the hardware accelerator is integrated on a common memory die with the scratchpad memory.

17. The system of claim 12, wherein the hardware accelerator is integrated on a system on a chip with the scratchpad memory.

18. The system of claim 12, the MAC array further comprising:
a multiplexer (mux) to provide alternate paths between the scratchpad memory and the MAC array; and
a mux controller to control the mux to select between the alternate paths.

19. The system of claim 18, wherein the mux controller is to control the mux for one input vector element to all X MAC circuits of the MAC array for a one-dimensional (1D) matrix-vector (M×V) computation.

20. The system of claim 18, wherein the mux controller is to control the mux for X different input vector elements to the X MAC circuits of the MAC array, respectively, for a two-dimensional (2D) matrix-matrix (M×M) computation.

21. The system of claim 12, wherein:
the processing unit comprises a multicore host processor device;
the system further comprises a display communicatively coupled to a host processor;
the system further comprises a network interface communicatively coupled to a host processor; or
the system further comprises a battery to power the system.

* * * * *